United States Patent [19]

Flotow et al.

[11] Patent Number: 4,503,959
[45] Date of Patent: Mar. 12, 1985

[54] CLUTCH LEVER AND ADJUSTMENT METHOD

[75] Inventors: Richard A. Flotow, Ft. Wayne; Jerry L. Rathburn; DeWayne F. Schlosser, both of Auburn, all of Ind.

[73] Assignee: Dana Corporation, Toledo, Ohio

[21] Appl. No.: 297,297

[22] Filed: Aug. 28, 1981

[51] Int. Cl.³ .................. F16D 13/44; F16D 13/75
[52] U.S. Cl. .................................. 192/70.3; 29/445; 51/281 SF; 192/99 A; 192/110 R
[58] Field of Search ............. 192/70.13, 70.19, 70.26, 192/70.3, 89 B, 99 A, 110 R; 29/445; 148/151, 139; 51/326, 327, 281 SF

[56] References Cited

U.S. PATENT DOCUMENTS

| | | | |
|---|---|---|---|
| 1,868,675 | 7/1932 | Spase | 29/274 |
| 1,935,678 | 11/1933 | Valpey | 33/181 |
| 1,984,231 | 12/1934 | Parker et al. | 29/274 |
| 1,995,738 | 3/1935 | Fish | 29/89 |
| 2,021,973 | 11/1935 | Wemp | 192/70.29 X |
| 2,044,087 | 6/1936 | Long | 33/180 |
| 2,044,818 | 6/1936 | Spase | 29/89 |
| 2,067,442 | 1/1937 | Frisz | 29/274 |
| 2,277,273 | 3/1942 | Spase | 192/70.26 |
| 2,367,969 | 1/1945 | Smith | 148/151 X |
| 2,599,982 | 6/1952 | Erwin | 33/181 |
| 3,042,557 | 7/1962 | Chenault | 148/151 X |
| 3,061,922 | 11/1962 | Lysett | 29/464 |
| 3,653,475 | 4/1972 | Thelander | 192/70.29 X |
| 4,332,314 | 6/1982 | Flotow | 192/70.29 X |

FOREIGN PATENT DOCUMENTS 2318997 4/1973 Fed. Rep. of Germany ... 192/99 A

*Primary Examiner*—Rodney H. Bonck
*Attorney, Agent, or Firm*—Frank B. McDonald

[57] ABSTRACT

A method is disclosed for constructing and adjusting a plurality of release levers of a friction disc clutch. The method ensures that the inner or nose ends of the release levers lie in a common plane upon final clutch assembly. In a preferred embodiment, a rivet is secured to the nose end of each release lever. The resulting lever unit is heat treated in a manner wherein the attached rivet is hardened throughout its entirety, while the lever per se is case hardened to a specified depth.

Next, a clutch cover, pressure plate, pressure means for urging the plate, and the plurality of heat treated lever units are installed together to form a clutch cover subassembly. Relative movement between the clutch cover and pressure plate is effected against the bias of the pressure means until the levers are in an extreme position relative to the clutch cover. The rivets are then machined, preferably by a grooved grinding wheel having a suitable contour in order to adjust the nose ends of the levers to a pre-determined common plane.

Alternatively, the heat treatment step may be limited to the rivet per se, wherein the rivet may be heat treated after the machining step.

8 Claims, 2 Drawing Figures

CLUTCH LEVER AND ADJUSTMENT METHOD

BACKGROUND OF THE INVENTION

This invention relates to an improvement in the method of manufacture of friction clutches of the type employed in automotive vehicles, and more particularly to a method for precisely and rapidly adjusting a plurality of bosses fixed to the inner ends of associated clutch release levers.

In the prior art, adjustment of the release levers during assembly of the clutch has presented a continuing problem. Many ingenuous techniques have been employed but most of them have been expensive and cumbersome to carry out. It is well understood by those skilled in the art that release levers in the clutch of an automotive vehicle must have durable wearing surfaces provided near their respective inner terminal portions. The respective wear surfaces must all lie in a common plane so that the release bearings associated with the clutch will engage the release levers uniformly and simultaneously. Such operation is necessary to insure that the pressure plate is maintained in a plane parallel to the flywheel, whereby excessive wear will be eliminated, and the release of the clutch will be efficient and complete.

The variety of methods employed to achieve coplanar operation of the release lever inner portions have been unsuitable in the mass production of clutches. Such methods have lacked both economy and convenience. For example, in one instance, the outer tail portions have employed adjustable threaded screws with jam nuts for locking thereon for use in connection with associated bosses on the back side of the pressure plate. Another method has employed adjustable rivets requiring the added step of checking heights of the heads thereof with micrometers or dial indicators prior to the locking of the rivets into individual positions.

To the extent that such release lever inner portion adjustments are absolutely essential for proper operation of the clutch assembly, those adjustments heretofore have been necessarily carried out with great care and attendant expense.

SUMMARY OF THE INVENTION

The invention described herein provides an economic means for achieving coplanar disposition of the release lever inner portions during clutch assembly. In a preferred embodiment, a rivet is secured to the nose end of each release lever. The resulting lever-rivet unit is then heat treated in a manner wherein the attached rivet is hardened throughout its entirety, while the lever per se is case hardened to a specified depth. Next, the clutch cover pressure plate, pressure means for urging the plate, and the plurality of heat treated lever-rivet units are installed together to form a clutch cover sub-assembly. Relative movement between the clutch cover and the pressure plate is effected against the bias of the pressure means, until the levers are in an extreme position relative to the clutch cover. The rivets are then machined, preferably by a contoured or grooved grinding wheel, in order to adjust the nose ends of the levers to a pre-determined common plane. Alternatively, in lieu of the heat treatment step described, non-heat treated rivets may be heat treated after the machining step. This may, for example, be accomplished by a flame hardening procedure as practiced by those skilled in this art.

DESCRIPTION OF THE PREFERRED METHOD AND EMBODIMENT

Figure 1:
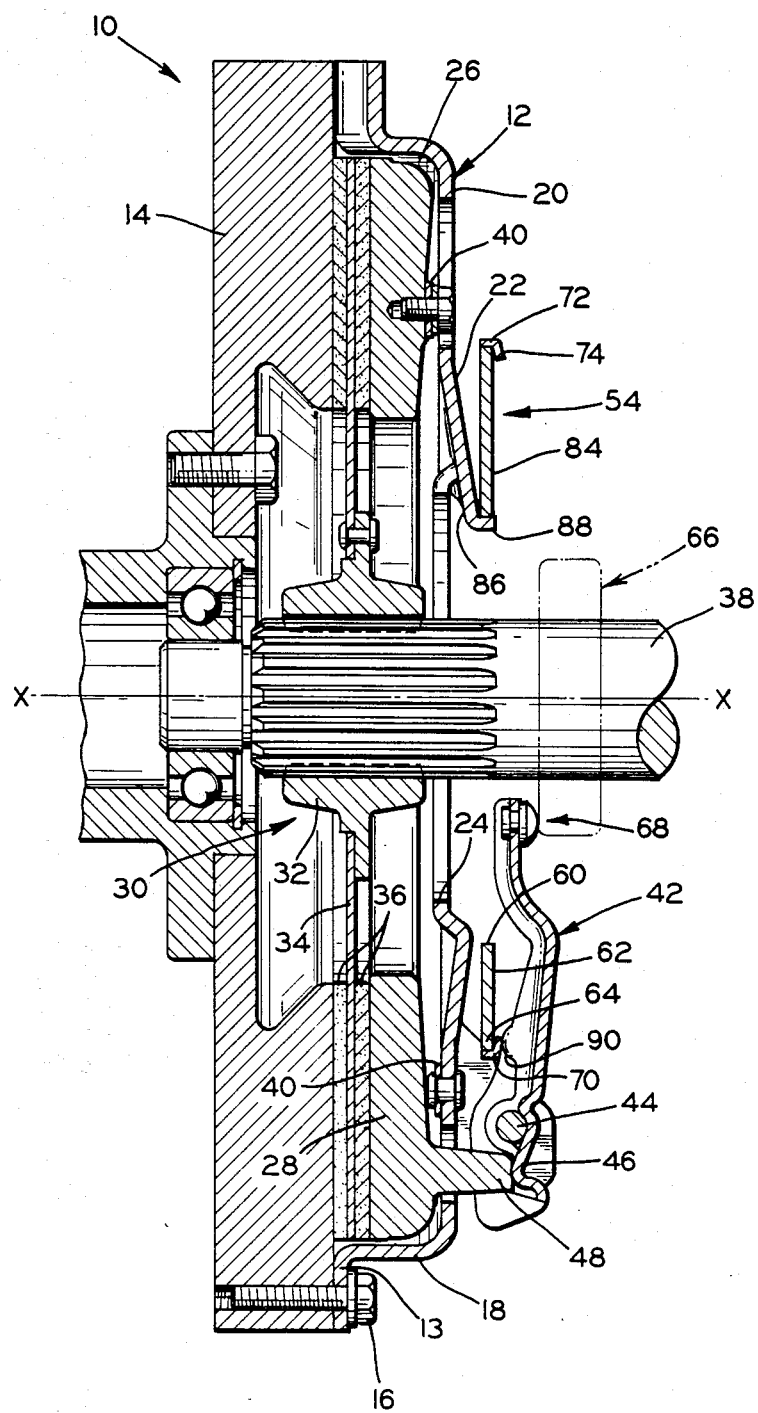
FIG. 1 is a cross section of a clutch employing the invention as described herein.

Referring to FIG. 1 of the drawings, in a perferred embodiment, a friction clutch is shown generally at 10 having a central axis X—X. The clutch 10, comprises an annular cover 12, having a peripheral flange portion 13. The latter portion 13 is secured to the rear face of a standard flywheel 14 by a plurality of circumferentially spaced bolts 16, so that the cover 12 rotates with the flywheel 14. The cover 12 further comprises a rim portion 18 extending in a generally axial direction, and an end wall 20 extending radially inwardly from the rim portion 18 and terminating in an angularly disposed ramp 22. The radially inner portion of ramp 22 defines a central opening 24 in the end wall 20 of the cover 12.

An annular space 26 is provided between the flywheel 14 and the cover 12 for receiving a pressure plate 28. A driven disc 30 is adapted to be clamped between the pressure plate 28 and the flywheel 14.

The driven disc 30 comprises a central hub 32 having a support plate 34 secured thereto with friction facings 36 fastened on opposite sides of the support plate 34. The central hub 32 is splined to the outer end of a transmission input shaft 38 with the friction facings 36 positioned between the pressure plate 28 and flywheel 14. The splined connection permits the driven disc 30 to move freely in an axial direction relative to the input shaft 38 while being rotatable with it.

The pressure plate 29 is axially movable into engagement with driven disc 30 to clamp the same against the flywheel 14 for drivingly connecting the rotatable drive and driven members of the clutch. A plurality of circumferentially spaced drive straps 40 rotatably connect the pressure plate 28 to the cover 12 and permit limited axial movement of the pressure plate 28 relative to the cover 12. The straps 40 further serve as a means to lift the pressure plate 28 away from the flywheel when the clutch 10 is actuated to its disengaged position. The opposite ends of the drive straps 40 are connected to both the cover 12 and the pressure plate 28 in a conventional manner.

A lever operating mechanism is provided to move the pressure plate 28 axially relative to the cover 12 and into and out of engagement with the driven disc 30. The lever operating mechanism is disposed wholly outside of the cover 12, and comprises a plurality of radially extending levers 42 pivotally connected to the cover 12 by pivot pins 44. Outer or tail ends 46 of each lever 42 engage integral bosses 48 formed on the pressure plate 28.

Resilient means 54 are provided to apply an axially engaging force to the pressure plate 28 to normally urge the same into clamping engagement with the driven disc 30. The resilient means is preferably designed to maintain a substantially constant pressure regardless of wear on the driven disc friction facing 36. In a preferred embodiment, the resilient means 54 is the annular Belleville spring 54 of FIG. 1, compressed between the cover 12 and the levers 42. The Belleville spring 54 in its unstressed state is conical in shape, having an inner peripheral portion 60, an intermediate cone-shaped portion 62, and an outer peripheral portion 64. Inner and outer peripheral portions 60 and 64 are axially spaced and approach the same plane as the spring 54 is placed under compression, the spring being designed to have a fixed inner peripheral portion 60 react against the cover 12, and a moveable outer peripheral portion 65 engage and be movable with the levers 42. Because of the spring movement, the cover ramp 22 is angled to permit clearance during operation.

The levers 42 are arranged to be depressed against the action of the spring 54 by a throw-out bearing 66 operating against inner or nose ends 68 of the levers 42. Operation of the throw-out bearing 66 causes the levers 42 to pivot about the pins 44. The outer ends 46 respond by moving the pressure plate 28 clampingly against the driven disc 30 to force same against the flywheel 14.

To equally distribute load from the spring to the levers 42, an annular collector ring 70 is provided. The collector ring 70 is cup-shaped in cross-section, and comprises an annular, axially extending rim 72 which encircles the outer peripheral portion 64 of spring 54, and has a radially inwardly extending annular base 74. The base 74 is adapted to be positioned between the back face of spring 54, and adjacent the front face of the levers 42. Thus, the base 74 is disposed for transfering the reaction load of the spring 54 to the levers 42, and is disposed at a slight angle to provide clearance for the outer peripheral portion 64 when the levers 42 are pivoted to their clutch disengaged position. The collector ring 70 has sufficient clearance with respect to the outer peripheral portion 64 to permit it to move freely during the various clutch operating stages. Since the levers 42 are in constant contact with the collector ring base 74, they serve to hold the collector ring 70 in place against the spring 54. If desired, the spring 54 may bear directly against the levers 42. However, it has been found that, rather than concentrating the engaging load directly under the levers 42, an equal distribution of the load will result from employment of the annular collector 70.

The outer peripheral portion 64 of the spring 54 is encircled by the collector ring 70 as described. The inner peripheral portion 60 contains a plurality of inwardly extending tongues 84. The tongues 84 are uniformly spaced apart, each tongue 84 extending into a corresponding recess 86 which in turn extends inwardly from the ramp 22. Each recess 86 contains side walls (not shown), and a lip 88 for a secure non-slipping engagement of the inner peripheral portion 60 of the spring 54 and the cover 12.

The operation of the clutch described is that of a conventional "push-type" clutch. Thus, in the normally engaged position of the clutch, the tongues 84 of the Belleville 54 will react in the recesses 86 of the cover 12. The outer periphery 64 of the Belleville 54 will urge the collector ring 70 axially outwardly against intermediate noses 90 of the levers 42. The levers 42 will then pivot about pins 44 and the outer ends 46 will exert an axially inward force against the pressure plate 28 through the pressure plate bosses 48.

To disengage the clutch, an operator will typically depress a clutch pedal with his left foot. This action will cause the throwout bearing 66 to move axially inwardly against the inner ends or noses 68 of the levers 42. The intermediate noses 90 will then urge the collector ring 70 axially inwardly, thus collapsing the Belleville and causing inner and outer peripheral portions 60 and 64 thereof to lie in a common plane. The levers 42 will pivot about pins 44, and the outer ends 46 thereof will release the axial pressure previously held against the pressure plate bosses 48.

It may now be appreciated that the adjustment of the ends of the inner noses 68 so that they lie in a common radially extending plane is extremely important for achievement of an evenly and fully axially distributed clutch loading. Otherwise, clutch will not engage and disengage smoothly, nor will the ends 68 wear evenly. Thus, the method of this invention provides a means for adjusting the inner noses 68 during assembly of the clutch.

Figure 2:
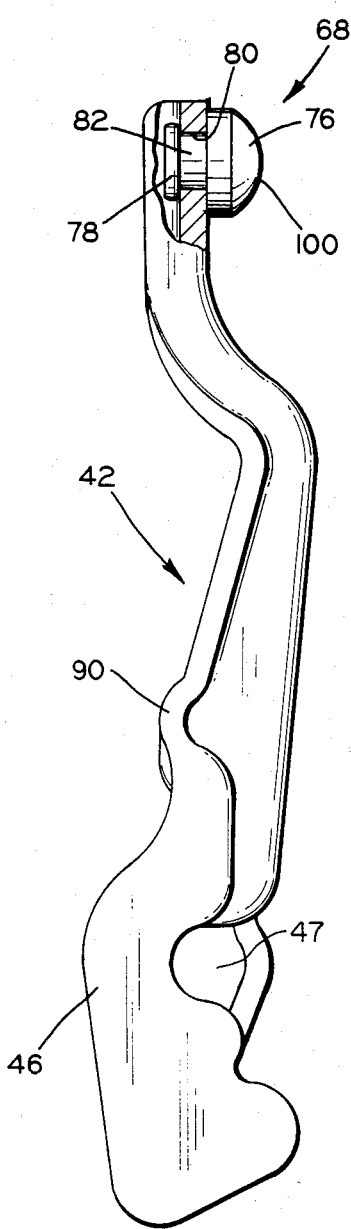
FIG. 2 is a side view partly in section of an improved lever of this invention as employed in the clutch of FIG. 1.

Referring now to FIG. 2, a preferred embodiment of a clutch lever 42, as employed in the aforedescribed clutch, includes an inner nose end 68, an outer end 46, and an intermediate nose 90 there between. The lever 42 is preferably comprised of a steel stamping, and includes a transversely extending bore 47 about which the lever 42 pivots on the aforementioned pin 44.

A plurality of such levers 42 each include a non-integral boss 76 (as distinguished from the preferred integral pressure plate bosses 48), preferably a rivet, secured to each of the inner nose ends 68 thereof. The shank end 82 of each rivet 76 is preferably inserted into a bore 80 in the inner nose end 68 to each clutch lever 42. Per conventional rivet installation practice, a lock nut 78 is then affixed to that portion of the inserted shank end 82 which extends from the bore 80. The plurality of the resulting boss-lever units are then heat treated in a manner resulting in the through-hardening of the boss 76, while the general lever body 42 is case hardened to a desired depth.

The plurality of the resultant boss-lever units are assembled into a clutch sub-assembly comprising the clutch 10 (FIG. 1) without the flywheel 14 or shaft 38. Thus, along with the levers 42, are assembled a clutch cover 12, a pressure plate 28, and pressure means for urging or biasing the pressure plate 28 away from the cover 12, such means preferably comprising a Belleville spring 54.

By employment of a clutch assembly fixture, as will be appreciated by those skilled in the art, relative movement between the clutch cover 12 and the pressure plate 28 is effected against the bias of the Belleville spring 54 (or other suitable pressure means), until the levers 42 are in an extreme position relative to the clutch cover 12. The boss ends 100 will then lie within an axial range, as will be understood by those skilled in the art. The ends 100 are then adjusted by machining step so as to terminate them in a pre-determined radially extending common plane. Such adjustment is preferably achieved by a radially extending grinding wheel having an annular concave groove therein. The preferred concave cross-section of the latter groove preferably corresponds dimensionally with the convex cross-section of heads of the rivets 76 being ground. The grinding wheel preferably has its center symmetrically positioned relative to the sub-assembly, so that all bosses 76 are ground simultaneously. Alternatively, other machining processes can be suitably employed, and thus the method and embodiment of the invention as herein described are not dispositive of the many variants which fall under the appended claims. For example, the heat treatment step can be suitably limited to the rivet instead of both rivet and lever, wherein the rivet may be flame hardened after the aforedescribed machining step.

What is claimed is:

1. In a friction clutch, including a cover, a plurality of levers moveable relative to said cover, each of said levers having an inner nose portion engageable with a clutch throw-out bearing, said clutch further including a pressure plate axially adjacent said cover, and pressure means for axially biasing said pressure plate away from said cover; an improvement comprising a method of adjusting said inner nost portions of said levers to a pre-determined common plane during assembly of said clutch, said method comprising the steps of:
   a. affixing an axially extending boss to each of said inner nose portions of said plurality of levers,
   b. effecting relative axial movement of said pressure plate toward said clutch cover against bias of said pressure means, wherein the axially extending extremity of each of said bosses lies within a pre-determined axial range, and
   c. simultaneously grinding by a grinding wheel having an annular concave groove to provide an axially extending contoured extremity on each of said bosses, such that said extremities lie in a pre-determined radially extending common plane within said range.

2. The method of claim 1 wherein each of said bosses is affixed by riveting to one of said inner nose portions of said plurality of levers to form boss and lever units.

3. The method of claim 2 further including the step of heat treating said boss and lever units prior to installation thereof into said clutch.

4. The method of claim 2 further including the step of heat treating said bosses after installation thereof into said clutch.

5. The method of claim 3 wherein said heat treatment of said boss and lever units comprises through-hardening of each said rivet, and case-hardening of each said lever.

6. The method of claims 3, 4, or 5 wherein said adjustment of said axially extending extremity of each of said bosses is effected by machining thereof to said common plane within said pre-determined axial range.

7. The method of claim 6 further comprising the step of assembling a friction clutch sub-assembly including (a) said clutch cover, (b) said clutch levers, (c) said pressure plate, and (d) said pressure means, prior to said step (b) of claim 1.

8. A friction clutch comprising a plurality of clutch levers, each lever comprising a longitudinal body having a nose and a tail portion, each said nose portion defining an inner end on each said lever, each said nose portion further comprising an axially extending boss affixed thereto, each said boss being simultaneously formed by a process of grinding with a grinding wheel having an annular concave groove to provide a contoured extremity on each said boss.

* * * * *